United States Patent
Keefer (10) Patent No.: US 6,701,239 B2
(45) Date of Patent: Mar. 2, 2004

(54) METHOD AND APPARATUS FOR CONTROLLING THE UPDATING OF A MACHINE DATABASE

(75) Inventor: Claude W. Keefer, Elmwood, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/120,043

(22) Filed: Apr. 10, 2002

(65) Prior Publication Data

US 2003/0195687 A1 Oct. 16, 2003

(51) Int. Cl.⁷ ................................ E02F 5/00; G06F 7/00
(52) U.S. Cl. .................... 701/50; 701/207; 701/300; 37/414
(58) Field of Search ................... 701/50, 200, 202, 701/205–208, 211–213, 300; 37/414, 415, 416, 382; 172/3, 4, 4.5

(56) References Cited

U.S. PATENT DOCUMENTS

| | | | |
|---|---|---|---|
| 5,375,663 A | * 12/1994 | Teach ..................... 172/4.5 |
| 5,438,771 A | 8/1995 | Sahm et al. |
| 5,471,391 A | 11/1995 | Gudat et al. |
| 5,493,494 A | 2/1996 | Henderson |
| 5,587,929 A | 12/1996 | League et al. |
| 5,600,436 A | 2/1997 | Gudat |
| 5,610,574 A | 3/1997 | Mutoh et al. |
| 5,612,864 A | 3/1997 | Henderson |
| 5,631,658 A | 5/1997 | Gudat et al. |
| 5,646,844 A | 7/1997 | Gudat et al. |
| 5,735,352 A | 4/1998 | Henderson et al. |
| 5,764,511 A | 6/1998 | Henderson |
| 5,768,810 A | * 6/1998 | Ahn ........................ 37/348 |
| 5,801,967 A | 9/1998 | Henderson et al. |
| 5,815,826 A | 9/1998 | Henderson et al. |
| 5,850,341 A | 12/1998 | Fournier et al. |
| 5,864,060 A | 1/1999 | Henderson et al. |
| 5,912,512 A | 6/1999 | Hayashi et al. |
| 5,925,085 A | 7/1999 | Kleimenhagen et al. |
| 5,935,192 A | 8/1999 | Henderson et al. |
| 5,944,764 A | 8/1999 | Henderson et al. |
| 5,964,298 A | * 10/1999 | Greenspun .............. 172/4.5 |
| 5,969,633 A | 10/1999 | Rosler |
| 6,028,254 A | * 2/2000 | McBratney .............. 800/320.1 |
| 6,047,227 A | 4/2000 | Henderson et al. |
| 6,073,068 A | 6/2000 | Koehrsen |
| 6,085,583 A | 7/2000 | Cannon et al. |
| 6,112,143 A | 8/2000 | Allen et al. |
| 6,144,113 A | 11/2000 | Hayashi et al. |
| 6,282,477 B1 | 8/2001 | Gudat et al. |

* cited by examiner

Primary Examiner—Michael J. Zanelli
Assistant Examiner—Eric M Gibson
(74) Attorney, Agent, or Firm—Kelsey L Milman; D. James Barnes (57) ABSTRACT

A method and apparatus for updating a machine database. The database includes data representing the desired and actual terrain of a work site. Additional data represents portions of the work site which have been further worked. An indicator detects the machine's current work function and updates the data in the database based on the current work function.

23 Claims, 6 Drawing Sheets

Fig. 1.

Fig_2_

Fig. 3.

Fig_4_

RIPPING VIEW

Fig. 5.

PRODUCTIVITY VIEW

| | 42 |
|---|---|
| VOLUME TO BE CUT | 1514 m³ |
| AREA TO BE RIPPED (CUT DEPTH > 3 m) | 512 m² |
| RIPPING PRODUCTIVITY (m² RIPPED SINCE START OF SHIFT) | 273 m² |

Fig. 6.

METHOD AND APPARATUS FOR CONTROLLING THE UPDATING OF A MACHINE DATABASE

TECHNICAL FIELD

The present invention relates generally to controlling data input for a machine database and, more particularly, to controlling the updating of the machine database during specific machine operations.

BACKGROUND

Machines, such as, for example, motor graders, dozers, compactors, and pavers, are typically used for surface-geography altering operations. As the machine works and alters the terrain, it is well known to record data related to the location of the machine and the desired and actual terrain topography. To this end, machines often are equipped with positioning systems, onboard or off board data systems, and onboard or off board data displays.

The positioning system often is comprised of a Global Positioning System (GPS) which includes a machine-mounted antenna for receiving position information from a satellite system. The antenna may be mounted to either the main body of the machine or to an implement attached to the machine.

When the antenna is attached to the main body, the elevation of the actual terrain under the machine may be determined as the machine travels, and data representative of the actual terrain topography may be stored in the data system. However, the location and elevation of the implement relative to the desired or actual terrain can not be determined from the positioning system when the antenna is attached to the main body. Thus, when the actual terrain is displayed in real time, as is preferable, the location of the implement can not be displayed in relation to the terrain being worked. Additional machine sensors may determine the position of the implement relative to the machine body, thus determining the implement location in relation to the actual terrain. However, this configuration leads to more complexity and, therefore, higher costs.

When the antenna is attached to the implement, the elevation and location of the implement may be determined. However, the elevation of the actual terrain is not known; the implement may perhaps be lifted and not engaged with the ground. Thus, as opposed to the main body/antenna configuration in which the actual terrain is known but the implement position is not known, in the implement/antenna configuration the position of the implement may be determined relative to the desired elevation for display to an operator, but the actual terrain is not known. Thus, typically a positioning system having an antenna attached to the implement does not determine an actual terrain; rather, a desired terrain is stored in the data system, and the implement is positioned by a control system to create the desired terrain configuration.

Further, it is known to mount dual antennas, one on the body of the machine and one on the implement in order to have the advantage of knowing both the actual terrain and the implement position. However, a two-antenna installation typically has a higher cost and complexity than a single antenna installation.

The present invention is directed to solving one or more of the problems as set forth above.

SUMMARY OF THE INVENTION

It is to be understood that both the foregoing general description and the following detailed description are exemplary and explanatory only and are not restrictive of the invention as claimed.

In a first embodiment, the present invention comprises a method for updating a dynamic site model based upon a current work function of a mobile machine, the machine having at least one work function, comprising the steps of determining the current work function of the machine; and updating data related to the current work function in the dynamic site model.

In a second embodiment, the present invention comprises an apparatus for updating a dynamic site model based upon a current work function of a mobile machine, the machine having at least one work function, comprising an indicator for providing an indication of the current work function of the machine; and a controller for receiving the indication, said controller updating data in the dynamic site model, said data associated with the current work function.

In a third embodiment, the present invention comprises an apparatus for displaying information to an operator of a mobile machine, comprising a receiver for providing position coordinate data corresponding to a position of at least a portion of the machine; an indicator for providing an indication of a current work function of the machine; a memory storing a model of a desired site and a model of the actual site; a controller for receiving the position coordinate data and the indication and selectively updating the memory with data corresponding to the position coordinate data based upon the current work function; and a display for displaying at least one of a difference between the desired and actual site models and an area of the site worked by one or more of the work functions.

In an embodiment, the present invention comprises a method for displaying information to an operator of a mobile machine, comprising the steps of providing position coordinate data corresponding to a position of at least a portion of the machine; determining a current work function of the machine; selectively updating a dynamic site model based upon the current work function; and displaying at least one of a representation of a difference between the dynamic site model and a desired site model and an area of the site worked by one or more of the work functions.

BRIEF DESCRIPTION OF THE DRAWINGS

The accompanying drawings illustrate exemplary embodiments of the invention and, together with the description, serve to explain the principles of the invention.

DETAILED DESCRIPTION

Reference will now be made in detail to embodiments of the invention, examples of which are illustrated in the accompanying drawings. Whenever possible, the same reference numbers will be used throughout the drawings to refer to the same or like parts.

Figure 1:
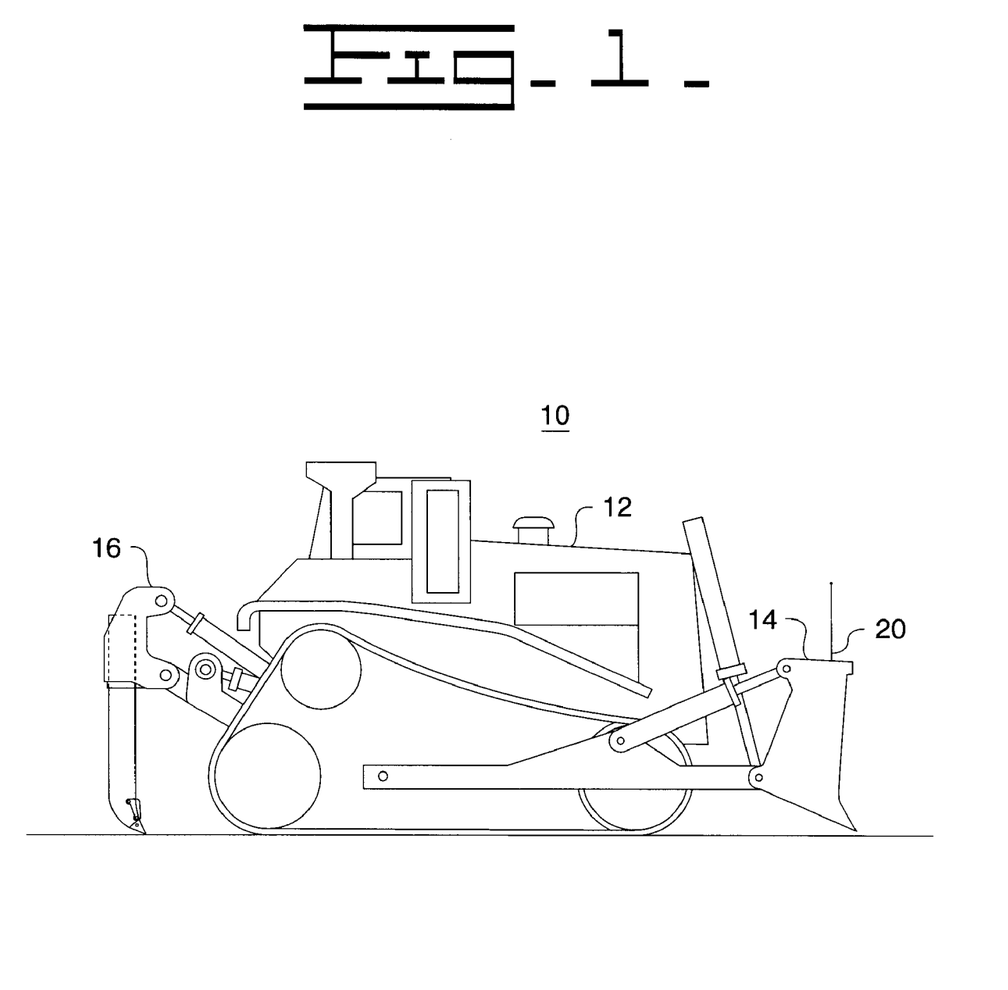
FIG. 1 is a representation of a machine having dozing and ripping capabilities.

For purposes of this disclosure, the present invention is described in connection with a mobile machine 10, such as, for example a dozer, motor grader, compactor, paver, and the like. FIG. 1, as an exemplary embodiment of the present invention, illustrates a machine 10 such as a dozer. The dozer includes a main body 12 which preferably has two implements, a blade 14 and a ripper 16, attached. The blade 14 preferably performs dozing operations, i.e. cutting and filling material as the machine 10 travels. The ripper 16 preferably performs scarifying operations, i.e. breaking up the ground or other material over which the machine 10 travels.

Figure 2:
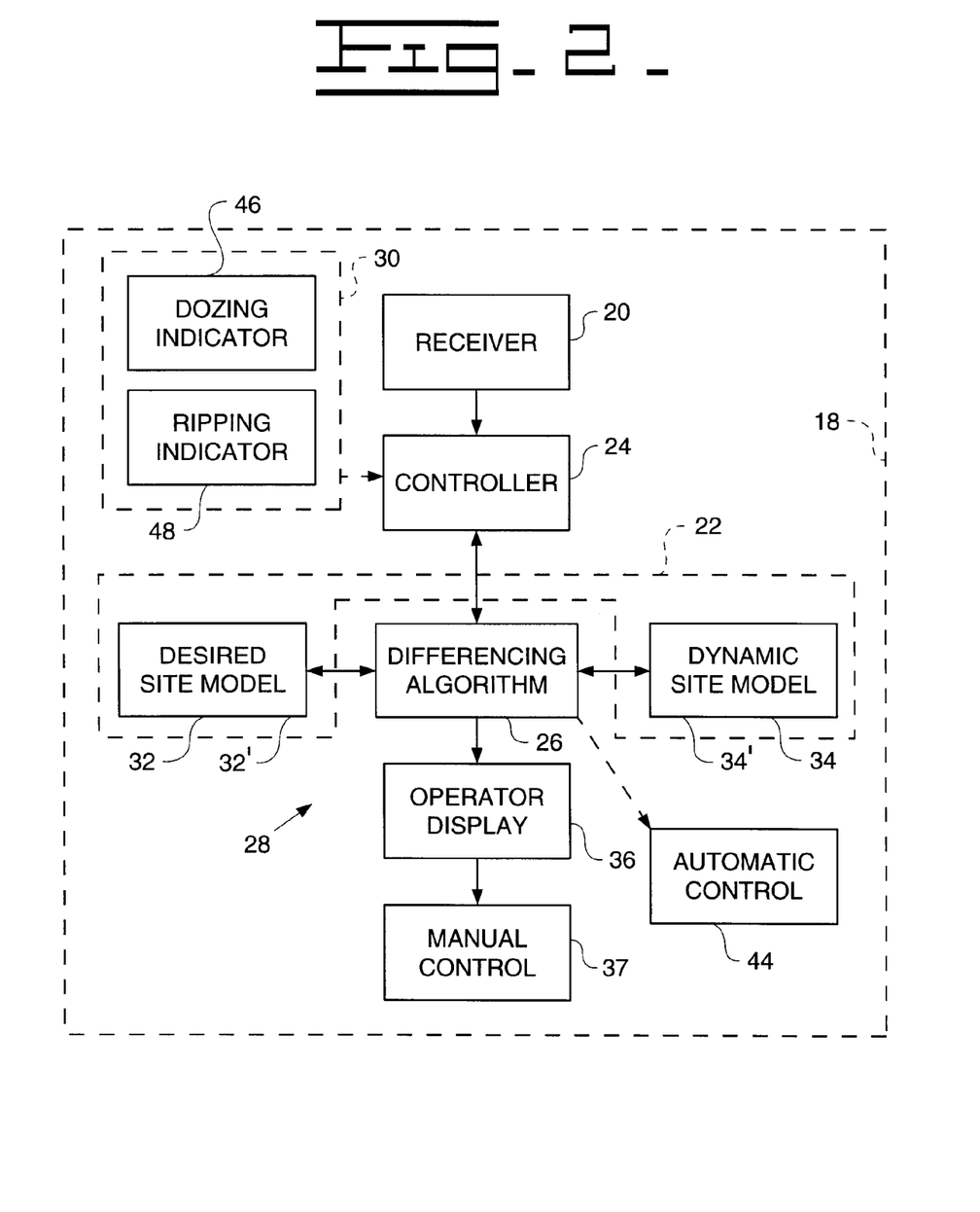
FIG. 2 is a block diagram of an exemplary embodiment of a positioning system associated with the machine.

A positioning system 18 having at least a portion located on the machine 10 determines the position of a point preferably located on the blade 14 of the machine 10. Preferably, the positioning system 18 is part of a known three-dimensional positioning system with an external reference, such as for example (but not limited to) GPS, 3-D laser, GPS/laser combinations, radio triangulation, microwave, radar, or the like. Typically, the positioning system 18 interpolates position-coordinate data in three dimensions to centimeter accuracy for moving objects. The positioning system 18 includes a receiver 20, a memory 22, a controller 24, a differencing algorithm 26, a directing means 28, and an indicator 30. Although the positioning system 18 is here shown on the mobile machine 10, some or all portions may be stationed remotely from the machine 10. For example, at least the memory 22, controller 24, and the differencing means 26 could be located remotely from the machine 10 and connected by radio data link to the directing means 28. Position and site update information could then be broadcast to and from the machine 10 for use by operators or supervisors both on and off the machine 10.

The receiver 20, or antenna, is preferably mounted on the blade 14 of the machine 10 and receives signals from positioning satellites and a local reference antenna. Thus, three-dimensional position coordinates of a reference point on the blade 14 can be determined as the machine 10 travels over a work site, such as for example a mine site or garbage dump.

The memory 22 preferably stores desired and dynamic site models 32 and 34 representing both the desired and actual topography of the work site. The memory 22 may be any suitable memory structure for storing data, including, but not limited to, random access memory, programmable read only memory, fixed disk drives, removable disk drives and the like. The desired site model 32 and the dynamic site model 34 each are comprised of data stored in a site database 32' and 34'. Preferably, the desired site database 32' and the dynamic site database 34' store elevation data representing at least site elevations (desired elevation and current elevation, respectively). In addition, the site databases 34' and 36' preferably store ripping data (desired area to be ripped and current ripped area, respectively). The ripping data may further indicate the desired and actual number of ripping passes and the desired and actual ripping depth. Alternatively, rather than storing the ripping data in the site databases 32' and 34', the ripping data may be stored in desired and dynamic ripping databases (not shown). In addition, the site databases 32' and 34' may store values of other parameters of the work site, such as material or ore type, previous elevation, and number of passes by the machine 10.

The controller 24 receives the position coordinate data from the antenna 20, determines the position of the reference point, and updates the dynamic site database 34'. The position coordinates are preferably supplied as a series of discrete points to the differencing algorithm 26 which then calculates the difference between the desired and dynamic site models 32 and 34. The differencing algorithm 26 may be implemented in software on the controller 24, or it may be comprised of a second controller (not shown) upon which software is installed or embedded.

Figure 3:
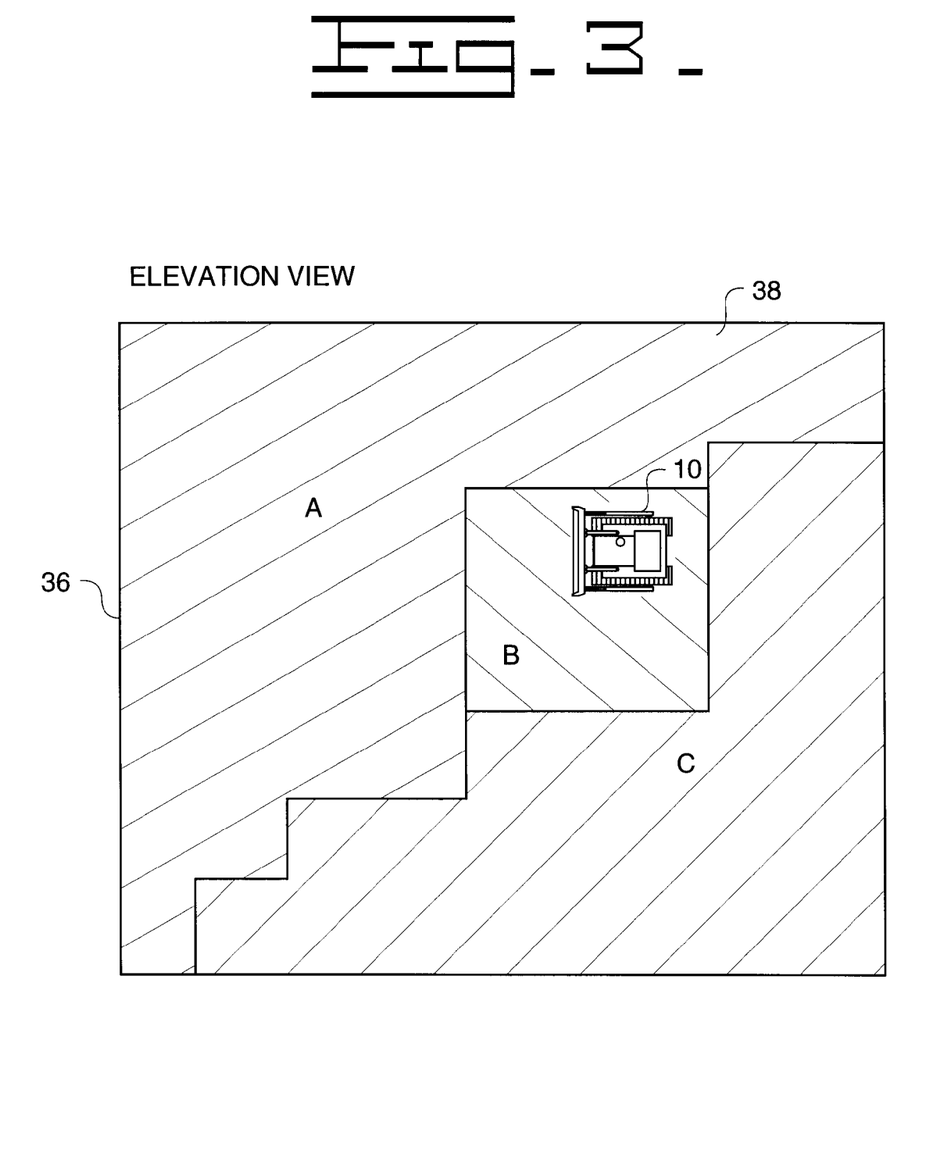
FIG. 3 is a representation of a first real time operator display generated according to an embodiment of the present invention for an exemplary work site.
Figure 4:
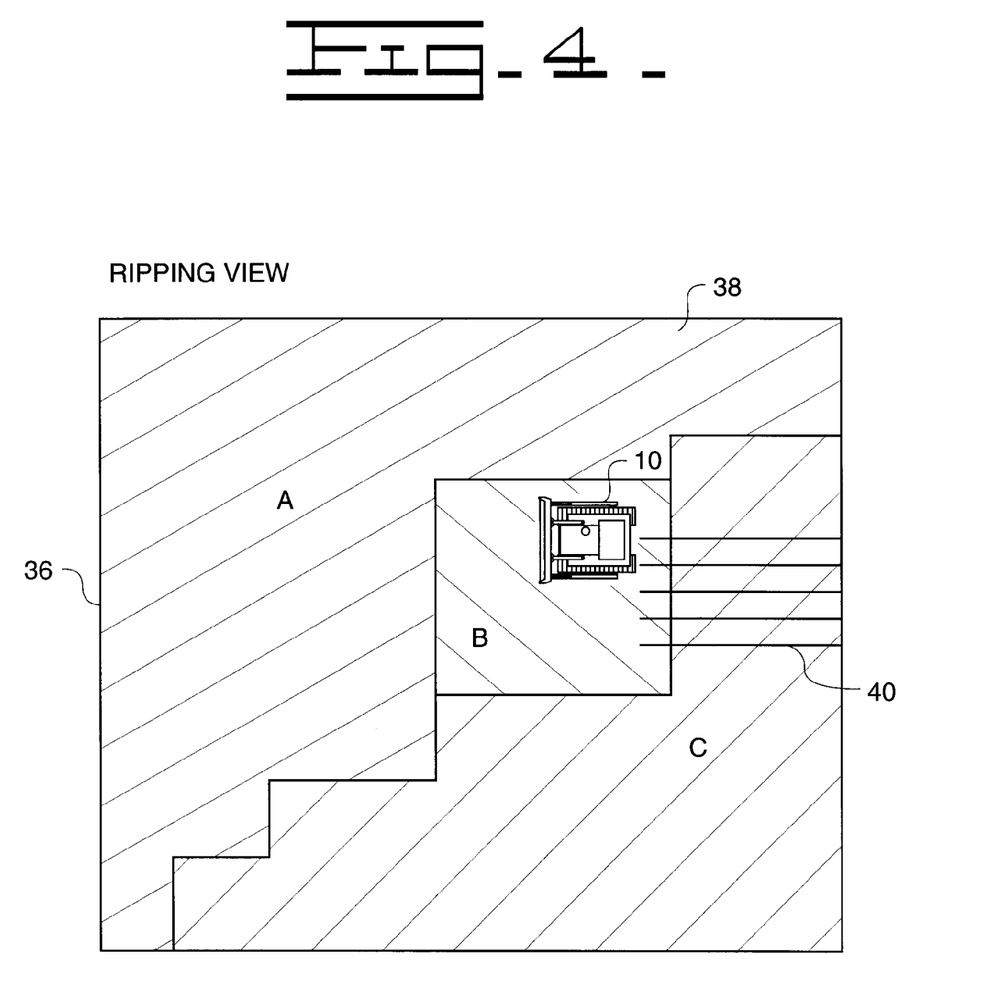
FIG. 4 is a representation of a second real time operator display generated according to an embodiment of the present invention for an exemplary work site.
Figure 5:
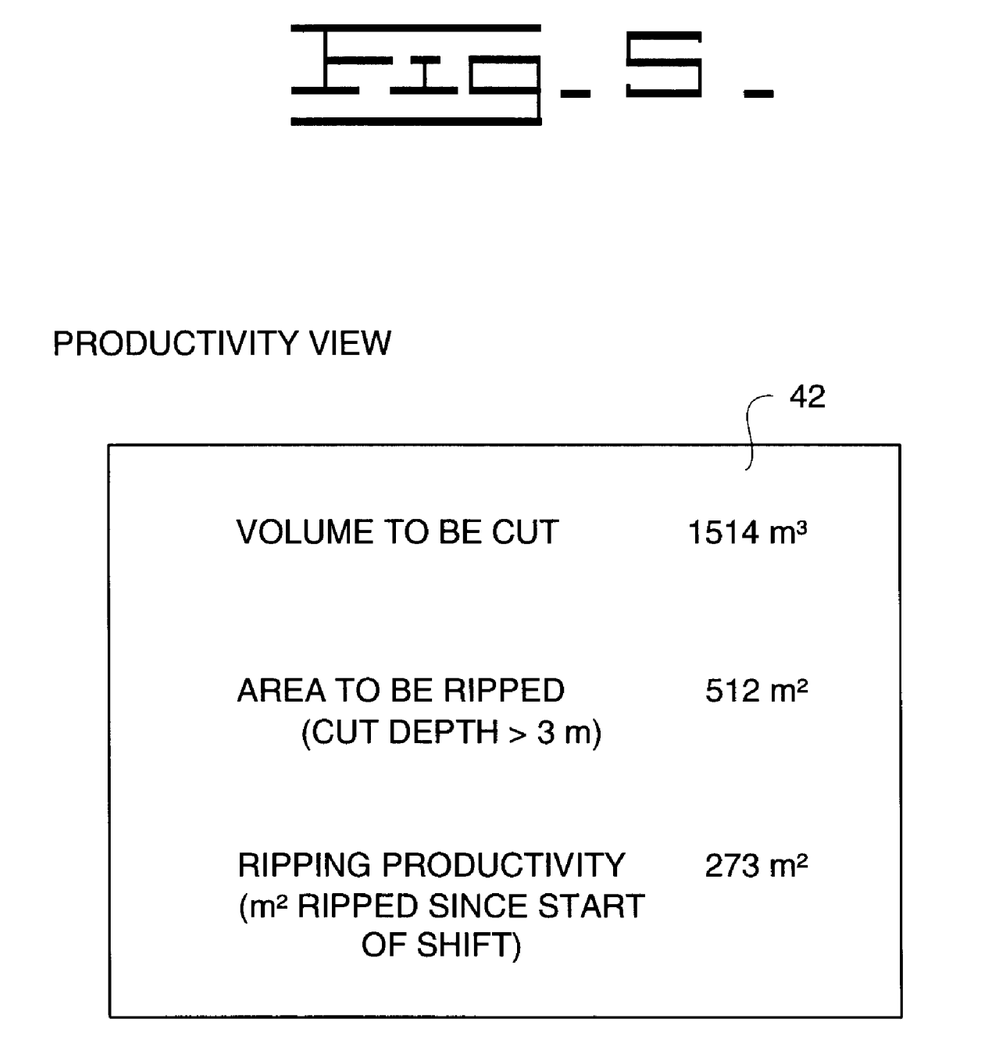
FIG. 5 is a representation of a productivity display generated according to an embodiment of the present invention for an exemplary work site.

The differencing algorithm 26 is operably coupled to the directing means 28. The directing means 28 accesses the databases 32' and 34' and responsively directs operation of the mobile machine 10. The directing means 28 preferably includes an operator display 34. As seen in FIGS. 3, 4 and 5, the operator display 34 is operative to display a plurality of views such as graphical representations 38 and 40 of the work site illustrating the desired and dynamic site databases 32' and 34', including the ripping data, and a productivity view 42 for disclosing at least cut and/or ripping data. The operator display 36 is used to assist the operator of the machine 10 in manual control 37 of the machine 10. As seen in FIG. 3, the position of the machine 10 relative to the work site is indicated on the display 36. In addition, preferably through the use of color, crosshatching, or other differentiation, an elevation plan, i.e. the difference between the desired and dynamic site databases 32' and 34' as determined by the differencing algorithm 26, is graphically displayed. For example, in FIG. 3, the area labeled A may be a higher elevation than the desired elevation and thus indicate an area to be cut. The area labeled B may be at the desired elevation, and the area labeled C may be lower then the desired elevation and need to be filled. In addition, as seen in FIG. 4, a graphical representation of the ripping data may be overlaid on the elevation plan. Alternatively, the ripping data may be displayed without the elevation information. Alternatively, or in addition, as seen in FIG. 5, the ripping data (in addition to other data) may be displayed numerically on the productivity view 42 on the operator display 36. Optionally, the directing means 28 may include an automatic control 44 for autonomously controlling operation of the machine 10 in response to the data stored in the databases 32' and 34'.

The indicator 30 is preferably comprised of a dozing indicator 46 and a ripping indicator 48. The dozing indicator 46 is operably connected to the controller 24 and determines whether or not the position coordinate data gathered by the antenna 20 should be applied to update the dynamic site database 34'. The dozing indicator 46 may be comprised of a switch (not shown) or other type of operator input device for receiving an instruction from the operator of the machine 10 as to whether or not the dynamic database 34' should be updated. Typically, the operator will engage the switch when the blade 14 is engaged with the ground; at that time, the elevation of the ground can be determined from the position coordinate data of the reference point on the blade 14. In a first alternative, the dozing indicator 46 may be comprised of one or more sensors (not shown) and an indicator controller (not shown) for receiving and analyzing input from the sensors. The indicator controller functionality may be performed by the controller 24 or other portion of the positioning system 18. The sensors may be comprised of one or more sensors to indicate the blade 14 is working, i.e. engaged with the ground, such as for example, load sensors on the blade, an engine speed sensor, and/or an engine load sensor. When the working sensors indicate that the blade is working, the dozing indicator 46 would determine that the dynamic site database 34' should be updated with the current terrain elevation. For example, through real time testing, it may be determined that when the machine 10 is dozing, the load on the engine is greater than 25% of the maximum horsepower. In this example, the load sensor would sense the load on the engine, and whenever it exceeded 25% of maximum horsepower, the indicator controller would determine that the blade 14 was engaged with the ground, and the dozing indicator 46 would indicate that the dynamic site database 34' should be updated with the incoming position coordinate data. In a second alternative, the dozing indicator 46 could determine if the blade 14 is engaged with the ground by a sensor in the blade control (not shown). For example, the sensor may determine if the operator's hand is on the blade control in the operator compartment of the machine 10. The dozing indicator 46, may use such a sensor in combination with one or more sensors to determine if the blade 14 is engaged with the ground.

The ripping indicator 48 is operably connected to the controller 24 and indicates whether or not the ripping data stored in the dynamic site database 34' should be updated. The ripping indicator 48 may be comprised of a switch or other operator input device for receiving an instruction from the operator of the machine 10 as to whether or not the ripper 16 is engaged with the ground, therefore indicating the ripping data should be updated. Alternatively, the ripping indicator 48 may be comprised of a sensor (not shown) on the ripper 16, such as for example, a proximity switch. The proximity switch typically determines if the ripper 16 is in its "home," or disengaged, position. If it is, the ripping data is not updated as the ground is not being ripped as the machine 10 travels. In addition, the proximity switch may be configured such that it also senses the angle from which the ripper 16 is moved from its home position. Thus, the ripper data may further indicate the depth of the rip.

Figure 6:
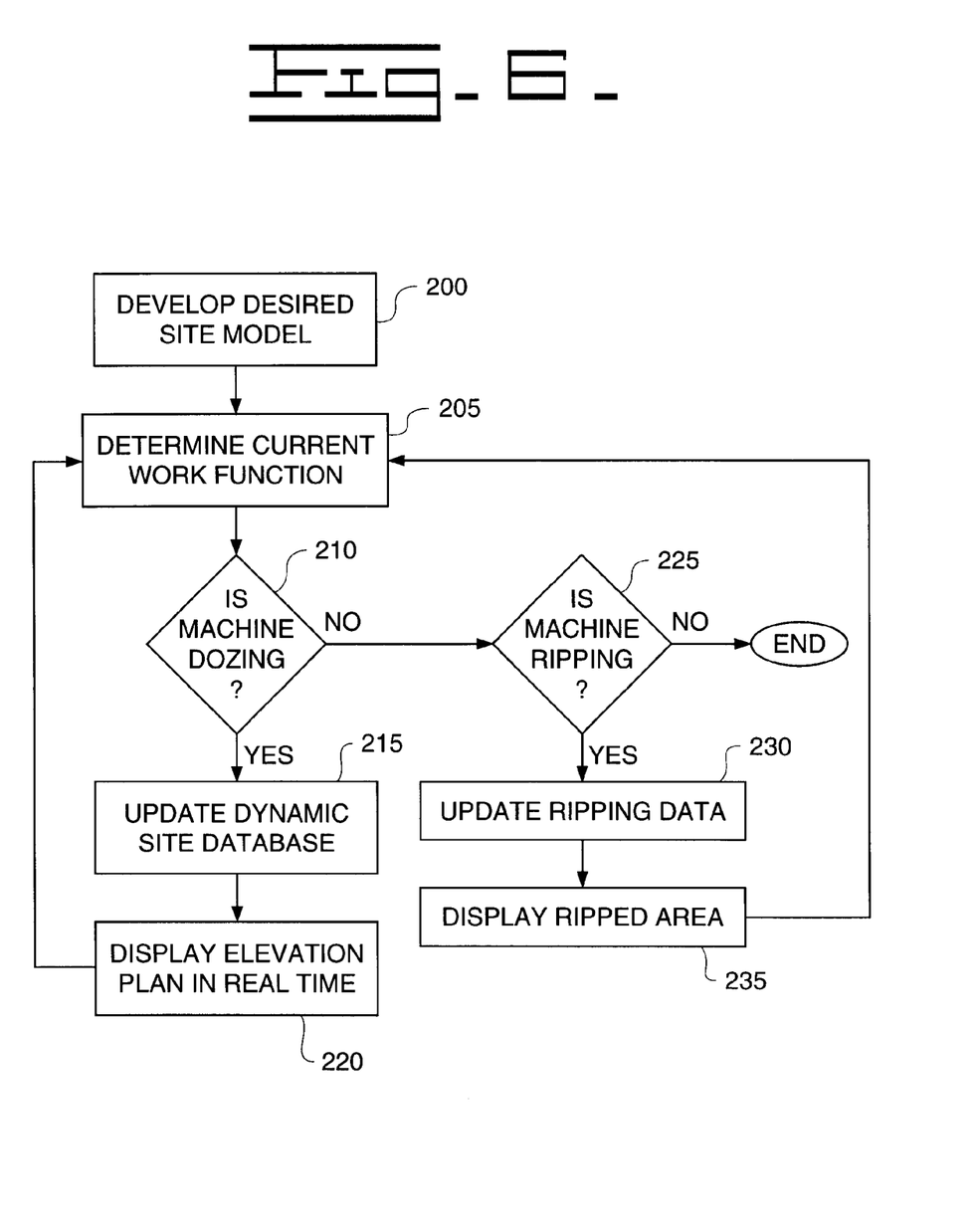
FIG. 6 is a flow chart of an exemplary embodiment of a method, consistent with the present invention, for updating a machine database during specific machine operations.

As seen in FIG. 6, a method for selectively updating the dynamic site database 34' is disclosed. In control block 200, the desired site model 32 is developed. This desired site model 32 is typically developed from an architect's site plan which is digitized and stored in the desired site database 32'. Preferably, the desired site model 32 and database 32' are developed prior to the machine's beginning work at the site. Once the machine 10 is in operation, as seen in control block 205, the current work function of the machine 10 is determined. Preferably, the current work function may be dozing or ripping, although other work functions, such as digging may occur. Typically, a machine 10 does not (and may be) incapable of performing more than one work function at a time. As seen in control block 210, whether or not the machine 10 is dozing is determined. Preferably, the dozing function is determined from the dozing indicator 46. The operator may manually indicate that dozing is occurring from the dozing indicator switch, or the dozing indicator 46 may autonomously determine that dozing is occurring from the one or more sensors. If the machine 10 is dozing, as seen in control block 215, the dynamic site database 34' is updated based upon the position coordinate data of the reference point on the blade 14. It is appropriate at this point to update the elevation data because, due to the machine's dozing, the blade 14 is engaged with the ground, and thus, the elevation of the ground can be easily determined as a function of the position coordinate data of the reference point. As the dynamic site database 34' is updated, as seen in control block 220, the graphical representation 38 of the terrain elevation is updated and displayed in real time for the operator. If, in control block 210, it is determined that the machine 10 is not dozing, control passes to block 225 in which it is determined if the machine 10 is ripping. Preferably, the ripping function is determined from the ripping indicator 48. The operator may manually indicate that ripping is occurring from the ripping indicator switch, or the ripping indicator 48 may autonomously determine that ripping is occurring from the one or more sensors. If the machine 10 is ripping, as seen in control block 230, the ripping data stored in the dynamic site database 34' is updated based upon the position coordinate data of the reference point on the blade 14. Then, as seen in control block 235, the graphical representation 40 may be updated in real time to display the current site elevation and an overlay of the ripped area. If in control block 225, it is determined that the machine 10 is not ripping, control ends.

INDUSTRIAL APPLICABILITY

The present invention provides a method and apparatus for controlling the updating of data in a machine database.

Often, for a positioning system 18 related to a mobile machine 10, it is preferable to include the receiver or antenna 20 on the blade 14 of the machine 10 in order to know the position of the blade 14 in relation to the ground and in relation to the desired design of the work site. Further, it is often preferable to know what areas of the site have been ripped, the ripping depth, and the number of ripping passes. In an embodiment of the present invention, as a machine 10 travels over a site, such as a mine site or a dump, the position of the machine 10 (via the position of the blade 14) relative to the site can be determined. As the machine 10 travels, a dozing indicator 46 determines if the dynamic site database 34' should be updated with the blade position information. If the blade 14 is engaged with the ground, the position, including the elevation, is updated in the database 34'. However, if the blade 14 is not engaged with the ground, for example if the machine 10 is traveling with the blade 14 in the air, the dynamic site database 34' is not updated as the elevation information from the blade 14 does not indicate the elevation of the terrain. When the blade 14 is no longer engaged with the ground, the dozing indicator 46 so determines, and the updating of the dynamic site database 34' ceases. Thus, the apparatus allows both for an indication of the blade position relative to the work site and for a dynamic site database 34' for display to an operator. Often, a work site, such as a dump, has a desired elevation configuration, such as for example, to accommodate water runoff. Allowing the dynamic site database 34' to be updated as the machine 10 travels provides a real time display to the operator so that he or she may more easily plan the dozing operation, i.e. placing cut material into areas needing fill.

In addition, as the machine 10 travels, a ripping indicator 48 determines if the ripping data stored in the dynamic site database 34' should be updated with the position information. If the ripper 16 is engaged with the ground, the position of the ripper, determined from the blade position information, is updated in the database 34'. In addition, various sensors preferably determine what depth is being ripped and the number of ripping passes which are also stored in the dynamic site database 34'. Often, at a site, such as a mine site, specific areas need to be ripped to break up the soil. For example, in a mine site, areas are typically ripped and acid applied to the area so that ore may be leached out of the soil. The soil needs to be ripped prior to application of the acid to more easily allow the acid to percolate through the soil.

Although the present invention has been described in relation to a mobile machine having both a blade and a ripper, the present invention is equally well suited to a machine having a single implement or work function.

It will be readily apparent to those skilled in the art that various changes and modifications of an obvious nature may be made, and all such changes and modifications are considered to fall within the scope of the appended claims. Other embodiments of the invention will be apparent to those skilled in the art from consideration of the specification and practice of the invention as disclosed herein. It is intended that the specification and examples be considered as exemplary only, with a true scope and spirit of the invention being indicated by the following claims and their equivalents.

What is claimed is:

1. A method for updating a dynamic site database based at least in part upon a current work status of an implement movably attached to a mobile machine, the implement being movable to a plurality of locations relative to the machine, the method comprising the steps of:
    changing the location of the implement relative to the machine;
    determining a first data component including position coordinate data corresponding to a position of at least a portion of at least one of the machine and the implement;
    determining a second data component including operating parameter data corresponding to at least one actual operating parameter of at least one of the machine and the implement, the operating parameter data being different than position coordinate data;
    determining the current work status of the implement as a function of the second data component; and
    selectively updating data related to the current work status in the dynamic site database based at least in part on the current work status.

2. The method, as set forth in claim 1, wherein the work status includes at least one of dozing and ripping.

3. The method, as set forth in claim 1, wherein said data that is updated is updated based upon a position of a reference point on at least one of the machine and the implement.

4. The method, as set forth in claim 1, wherein the step of determining a second data component includes:
    sensing the actual operating parameter with at least one indicator coupled to at least one of the machine and the implement.

5. The method, as set forth in claim 4, wherein the indicator is operable to sense at least one of a load on the blade, a speed of the engine, and a load on the engine.

6. The method, as set forth in claim 1, wherein said updating step includes:
    determining a position of a reference point on at least one of the machine and the implement; and
    determining data to be stored in said dynamic site database based, at least in part, upon said position of said reference point.

7. The method, as set forth in claim 6, wherein said reference point is located on said implement.

8. The method, as set forth in claim 7, further including the step of:
    displaying a difference between the updated dynamic site database and a desired site database.

9. The method, as set forth in claim 1, including:
    automatically determining whether the work implement is engaged with a work terrain as a function of the second data component; and
    automatically determining the current work status of the work implement as a function of whether the work implement is engaged with the work terrain.

10. The method, as set forth in claim 1, wherein the step of updating data includes updating the dynamic site database with the first data component.

11. The method, as set forth in claim 1, wherein the at least one actual operating parameter is indicative of at least one of a load on the blade, a speed of the engine, and a load on the engine.

12. An apparatus for updating a dynamic site database based at least in part upon a current work status of an implement attached to and locationally movable relative to a mobile machine, the apparatus comprising:
    a positioning system operably coupled with at least one of the mobile machine and the implement the positioning system being operable to determine a first data component including position coordinate data corresponding to a position of at least a portion of at least one of the machine and the implement;
    an indicator operably coupled with at least one of the machine and the implement and being operable to indicate a second data component including operating parameter data corresponding to at least one actual operating parameter of at least one of the machine and the implement, the operating parameter data being different than position coordinate data, the indicator being operable to provide an indication of the current work status of the implement as a function of the second data component; and
    a controller operably coupled with the indicator and being operable to selectively update database data in the dynamic site database based at least in part on the indication, said database data associated with the current work status.

13. The apparatus, as set forth in claim 12, wherein the work status includes at least one of dozing and ripping and wherein said database data includes at least one of elevation data and ripping data.

14. The apparatus, as set forth in claim 12, wherein said database data is updated based upon a position of a reference point on at least one of the machine and the implement.

15. The apparatus, as set forth in claim 12, wherein:
    the positioning system includes a receiver for providing a signal indicative of a position of a reference point on at least one of the machine and the implement;
    said controller receiving said signal and determining the data to be stored in the dynamic site database based, at least in part, on said position of said reference point.

16. The apparatus, as set forth in claim 15, wherein said reference point is located on said implement.

17. The apparatus, as set forth in claim 16, further including:
    a display for displaying a difference between the updated dynamic site database and a desired site database.

18. The apparatus of claim 12, wherein the indicator is operable to sense at least one of a load on the blade, a speed of the engine, and a load on the engine.

19. An apparatus for displaying information to an operator of a mobile machine having an implement attached thereto, the implement being locationally movable relative to the machine, the apparatus comprising:
    a positioning system operably coupled with at least one of the mobile machine and the implement, the positioning system being operable to determine a first data component including position coordinate data corresponding to a position of at least a portion of at least one of the machine and the implement;
    an indicator operably coupled with at least one of the machine and the implement and being operable to indicate a second data component including operating parameter data corresponding to at least one actual operating parameter of at least one of the machine and the implement, the operating parameter data being different than position coordinate data, the indicator being operable to provide an indication of a current work status of the implement as a function of the second data component;

a memory storing a model of a desired site and a model of the actual site;

a controller operable to receive said position coordinate data and said indication and selectively update said memory based at least in part on the indication, said memory updated with data determined from said position coordinate data; and a display for displaying at least one of a difference between the desired and actual site models and an area of the site worked by the implement.

20. The apparatus, as set forth in claim 19, wherein said work status includes at least one of dozing and ripping, and wherein said indicator includes at least one of a dozing indicator and a ripping indicator, and wherein said data that said memory is updated with includes at least one of elevation data associated with dozing and ripping data associated with ripping.

21. The apparatus of claim 19, wherein the indicator is operable to sense at least one of a load on the blade, a speed of the engine, and a load on the engine.

22. A method for displaying information to an operator of a mobile machine having an implement movably attached thereto, the implement being movable to a plurality of locations relative to the machine, the method comprising the steps of:

changing the location of the implement relative to the machine;

providing a first data component including position coordinate data corresponding to a position of at least a portion of at least one of the machine and the implement;

providing a second data component including operating parameter data corresponding to at least one actual operating parameter of at least one of the machine and the implement, the operating parameter data being different than position coordinate data;

determining a current work status of the implement as a function of the second data component;

selectively updating a dynamic site model based at least in part upon the determination; and displaying at least one of a representation of a difference between the dynamic site model and a desired site model and an area of the site worked by the implement.

23. The method, as set forth in claim 22, wherein the step of providing a second data component includes the step of:

sensing the actual operating parameter with at least one indicator coupled to at least one of the machine and the implement.

\* \* \* \* \*